3,103,502
STABILIZED ORGANOPOLYSILOXANES
Arthur C. Martellock, Schenectady, N.Y., assignor to General Electric Company, a corporation of New York
No Drawing. Filed Aug. 26, 1958, Ser. No. 757,219
8 Claims. (Cl. 260—46.5)

This invention relates to the stabilization of organopolysiloxanes and to organopolysiloxanes of improved properties resulting from such stabilization. More particularly, the present invention relates to the preparation of organopolysiloxanes of improved moisture stability and thermal stability by a process which comprises contacting an organopolysiloxane polymerized with an alkali-metal compound which is a basic siloxane rearranging and polymerizing agent containing an alkali-metal ion used in the preparation of higher molecular weight organopolysiloxanes from lower molecular weight organopolysiloxanes, the organo groups of the aforesaid organopolysiloxane being hydrocarbon groups or substituted hydrocarbon groups, with a quaternary compound selected from the class consisting of quaternary ammonium halides and quaternary phosphonium halides.

It is well known in the art to prepare high molecular weight organopolysiloxanes from lower molecular weight organopolysiloxanes. This process has been carried out in both acid media and under the influence of alkaline catalysts. For a number of reasons, it has been found that the use of alkaline catalysts is much more desirable in the polymerization of low molecular weight organopolysiloxanes to higher molecular weight materials. Among the most widely used alkaline organopolysiloxane polymerization catalysts are those catalysts which can be described generally as being alkali-metal compounds. For example, octamethylcyclotetrasiloxane, which is a low viscosity fluid, can be converted to an organopolysiloxane gum having a viscosity in excess of one million centipoises, by contacting the octamethylcyclotetrasiloxane with a catalytic amount of potassium hydroxide.

Although the alkali-metal compound polymerization of low molecular weight organopolysiloxanes to higher molecular weight materials has gained wide acceptance in the art, there are still a number of disadvantages inherent in the use of this type of polymerization catalyst. The primary disadvantage is that the alkali-metal compound polymerized high molecular weight organopolysiloxane is relatively unstable when exposed to a moist environment, or when subjected to elevated temperatures. It is believed that this lack of stability is due to the catalytic reversion of the high molecular weight material to the lower molecular weight state under the influence of the alkali-metal compound. Because of this lack of moisture stability and thermal stability, it has heretofore been proposed to remove the alkali-metal compound from the high molecular weight organopolysiloxane or to neutralize the alkali-metal compound. However, all of the methods known in the art offer some disadvantages.

For example, one suggested method of removing the alkali-metal compound from the high molecular weight organopolysiloxane is by washing of the organopolysiloxane with water. This method offers certain disadvantages in that, first, it is extremely difficult to wash organopolysiloxanes, whether they be in liquid form or in the form of high molecular weight compounds. Secondly, it is necessary to remove the wash water from the gum, thus introducing an additional expensive process step in the preparation of high molecular weight organopolysiloxanes.

Another method suggested for the stabilization of alkali-metal compound polymerized organopolysiloxanes is by neutralization of the alkali-metal compound after polymerization has been effected. One such method comprises the addition of acids to chemically neutralize the alkali-metal compounds. Although this procedure satisfactorily eliminates the basicity of the organopolysiloxane, unless the amount of acid added to the organopolysiloxane is carefully controlled, the resulting material is acidic in nature. If the resulting material is acidic, the resulting product is still moisture unstable and thermally unstable. This means that, as a practical matter, whenever acids are employed for neutralization of the alkali-metal catalysts in the organopolysiloxane, it is necessary to wash or remove the acid from the material. The washing of the resulting material introduces the disadvantages described above.

One effective method for the neutralization of alkali-metal compounds in organopolysiloxanes is the method described and claimed in Patent 2,789,109—Grubb, which comprises the neutralization of alkali-metal compound catalyst by incorporating elemental iodine into the catalyzed organopolysiloxanes, with the subsequent removal of excess iodine by evaporation. Although the process of the Grubb patent can be utilized to prepare perfectly satisfactory organopolysiloxane gums, there are several inherent difficulties in the process. The first of these difficulties is the necessity of removing the excess iodine from the neutralized silicone gum. The second difficulty is that iodine is extremely corrosive in nature and is thus difficult to handle.

Another satisfactory method for neutralizing alkali-metal compounds from alkali-metal polymerized organopolysiloxanes is the method described in Patent 2,739,952—Linville. This method comprises the treatment of an alkali-metal compound polymerized organopolysiloxane with an organophosphorus compound capable of reacting with the alkali-metal ion or atom in the alkali-metal compound. For most applications, this method is completely suitable. However, it is sometimes desirable to employ steam distillation in the removal of low molecular weight organopolysiloxanes from alkali-metal compound polymerized high molecular weight materials. Thus, for example, in the preparation of high molecular weight dimethylpolysiloxane gum from octamethylcyclotetrasiloxane, it is found that an equilibrium exists between the high molecular weight gum and low molecular weight octamethylcyclotetrasiloxane or intermediate products. Generally, these low molecular weight materials comprise from about 10 to 15 percent, by weight, of the total weight of the gum. For some applications, it is desirable to remove these low molecular weight materials by means of steam distillation, which comprises subjecting the gum to an atmosphere of steam, which causes volatilization of the low molecular weight materials, which are removed with a portion of the steam. When employing the organophosphorus compounds of the aforementioned Linville patent, it is found that steam sometimes causes hydrolysis of the organophosphorus group, resulting in the formation of alcohols and phosphorus containing acids. The alcohols are usually removed from the gum during the steam treatment, leaving the acidic material in the gum. This acidic material, of course, is undesirable since it renders the gum unstable to both moisture and elevated temperature. Thus on continued treatment of the gum with steam, the gum reverts to a low molecular weight state, which adversely affects the properties of elastomers prepared from the gum.

It is, therefore, one of the objects of the present invention to improve the thermal stability of organopolysiloxanes which have been polymerized to high molecular weight by alkali-metal compounds.

Another object of the invention is to improve the moisture stability of organopolysiloxanes which have been polymerized to a high molecular weight by means of alkali-metal compounds.

A still further object of the present invention is to provide alkali-metal compound polymerized organopolysiloxanes having improved thermal stability and moisture stability.

These and other objects of my invention are accomplished by effecting reaction between a quarternary compound selected from the class consisting of quarternary ammonium halides and quaternary phosphonium halides and an organopolysiloxane which has been polymerized from a low molecular weight state to a high molecular weight state by means of an alkali-metal compound.

The quaternary compounds which can be employed in the practice of the present invention are the well-known class of quarternary ammonium halides and quaternary phosphonium halides and include those quaternary ammonium halides having the formula (1) $(Y)_4NX$ and the quaternary phosphonium halides having the formula (2) $(Y)_4PX$ where Y represents a monovalent hydrocarbon radical free of aliphatic unsaturation, for example, alkyl radicals, e.g., methyl, ethyl, butyl, octyl, etc. radicals; cycloalkyl radicals, e.g., cyclohexyl, cycloheptyl, etc. radicals; aryl radicals, e.g., phenyl, naphthyl, tolyl, xylyl, etc. radicals; aralkyl radicals, e.g., benzyl, phenylethyl, etc. radicals; and X represents halogen, i.e., fluorine, chlorine, bromine, or iodine. Among the particular quaternary compounds useful in the practice of the present invention may be mentioned, for example, tetramethyl ammonium chloride, tetramethyl ammonium iodide, tetramethyl ammonium bromide, tetrabutyl ammonium chloride, tetrabutyl ammonium iodide, benzyl trimethyl ammonium iodide, tetraethyl phosphonium chloride, tetrabutyl phosphonium iodide, benzyl triphenyl phosphonium fluoride, tetraphenyl phosphonium bromide, etc.

As previously mentioned, the organopolysiloxanes which are stabilized by the process of the present invention are organopolysiloxanes which have been polymerized with an alkali-metal compound which is a basic siloxane rearranging and polymerizing agent and which contains an alkali-metal ion. These alkali-metal compounds include the hydroxides of the alkali-metals, such as sodium hydroxide, potassium hydroxide, rubidium hydroxide, and cesium hydroxide, as well as other basic materials which contain an alkali-metal ion. Other alkali-metal compounds useful in the practice of the present invention include alkali-metal alkoxides having the formula MOR, where M is an alkali-metal ion, e.g., lithium, potassium, sodium, rubidium, and cesium, and R is an alkyl radical, e.g., methyl, ethyl, propyl, isopropyl, butyl, hexyl, etc.; alkali-metal thioalkoxides having the formula MSR, where M and R have the meanings given above; alkali-metal silanolates having the formula (3) $(R')_m(OH)_{3-m}SiOM$ where R' is a member selected from the class consisting of alkyl, cycloalkyl, aryl, aralkyl, etc., hydrocarbon radicals; m is an integer equal to from 1 to 2, inclusive, and M has a meaning given above, as shown, for example, in MacMullen Patent 2,587,636; alkali-metal complexes of aromatic compounds (e.g., potassium complexes with naphthalene, anthracine, etc.); alkali-metal complexes having the formula (4) $(R'OH)_xMOH$ where R' and M have the meanings given above and x has a value equal to from about 0.5 to 2.5, e.g., a complex of methanol and sodium hydroxide having a neutral equivalent of 74.7, a complex of potassium hydroxide and isopropanol having a neutral equivalent of 167, etc., as well as other compositions of the type described in Warrick Patent 2,634,252; alkali-metal salts of organopolysiloxanes, e.g., the sodium salt of tetramethylsiloxane diol, etc. (see Hyde Patent 2,634,284).

One of the requirements for the alkali-metal compound is that it be sufficiently alkaline or basic in nature to effect the desired siloxane rearrangement and polymerization of the various organopolysiloxanes with which the present invention is concerned at temperatures of the order of 80 to 175° C. This basicity may be determined by dissolving or dispersing the alkali-metal compound and determining whether it gives a pH above 7, preferably above 10. Adequate basicity may be determined by measuring an aqueous solution or dispersion of the alkali-metal compound at a concentration not greater than 0.1 N, and determining whether it has the desired alkaline pH. An alkali-metal compound of adequate basicity is generally one which, when dissolved or dispersed in water, can be titrated with acids to a neutral end point. The alkali-metal compound may be a suitable basic (i.e., alkaline) compound, which is a salt of a weakly acidic ion such that the compound in contact with water gives an alkaline reaction. Accordingly, the term "alkali-metal compound" is not intended to be limited to the specific types of such compounds specifically described above, but rather is intended to include those, as well as other basic alkali-metal compounds capable of acting in the same fashion for the designated purpose.

The process of the present invention is applicable to all types of organopolysiloxanes which have been polymerized from a low molecular weight state to a higher molecular weight state employing an alkali-metal compound to effect the polymerization. Thus, the process is applicable to organopolysiloxane resins, fluids, and elastomers. However, the invention is particularly applicable to organopolysiloxane fluids and elastomers in which the problem of moisture stability and thermal stability is most pronounced. These organosilicon fluids and gums may be described generically as having the average formula (5) $(R'')_n SiO_{\frac{4-n}{2}}$ where n has the value of from about 1.9 to 2.5 and R'' represents monovalent organic radicals such as various hydrocarbons and substituted hydrocarbon radicals. Among the specific types of radicals which R'' represents are included, for example, both saturated and unsaturated aliphatic radicals and also aromatic hydrocarbon radicals. Specifically, R'' represents alkyl radicals, e.g., methyl, ethyl, propyl, octyl, octadecyl, etc. radicals; cycloalkyl radicals, e.g., cyclohexyl, cycloheptyl, etc. radicals; aryl radicals, e.g., phenyl, diphenyl, naphthyl, tolyl, xylyl, etc. radicals; aralkyl radicals, e.g., benzyl, phenylethyl, etc. radicals; olephinically unsaturated aliphatic hydrocarbon radicals; e.g., vinyl, allyl, butenyl, cyclohexenyl, etc. radicals; acetylenically unsaturated hydrocarbon radicals, e.g., ethynl, propynl, etc. radicals; halogenated aromatic hydrocarbon radicals, e.g., chlorophenyl, dibromophenyl, tetrachlorophenyl, etc. radicals, haloalkyl radicals, e.g., chloromethyl, perchloroethyl, etc. radicals; cyanoalkyl radicals, e.g., cyanomethyl, beta-cyanoethyl, beta-cyanopropyl, gamma-cyanopropyl, etc. radicals. Among the preferred compositions within the scope of Formula 5 above, are those in which the R'' radicals represent both methyl and phenyl radicals and in which at least 50% of the R'' radicals are methyl radicals.

The organopolysiloxanes to which the process of the present invention is applicable are generally well-known in the art and their method of preparation by the polymerization of low molecular weight organopolysiloxanes to higher molecular weight organopolysiloxanes in the presence of alkali-metal compounds is also known.

One class of organopolysiloxanes within the scope of the present invention are the triorganosilyl chain-stopped organopolysiloxane fluids which are prepared by effecting interpolymerization between various organopolysiloxanes, e.g., polydiorganosiloxanes of the formula (6) $$[(R'')_2SiO]_a$$

and low molecular weight linear polysiloxanes of the formula (7) 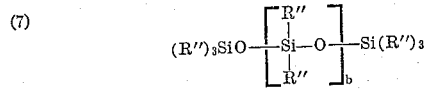

where R'' is as previously defined, $a$ is an integer equal to from 3 to 9 or more, and $b$ is a whole number equal to from 0 to 6, by employing alkaline siloxane rearranging agents, e.g., alkali-metal hydroxides such as sodium hydroxide, potassium hydroxide, lithium hydroxide, rubidium hydroxide, or cesium hydroxide, to obtain long-chain organopolysiloxanes of the formula (8) 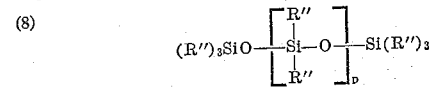

where $p$ is a whole number greater than 1, e.g., from about 6 to 200 or higher. In general, the organopolysiloxane fluids employed in the practice of the present invention should, in the polymerized state, have a viscosity in excess of about 1000 centipoises. Many of the organopolysiloxane fluids within the scope of Formula 8 are disclosed and claimed in Patnode Patents 2,469,888 and 2,469,890, and in Fletcher et al. Patent 2,599,984.

In addition to the triorganosilyl chain-stopped fluids within the scope of Formula 8, fluids employed in the practice of the present invention also include those silanol chain-stopped fluids, such as are prepared by effecting reaction between one or more diorganosiloxanes within the scope of Formula 6 and an alkali-metal compound in the presence of minor amounts, e.g., from about 30 to 1000 parts per million, of water. This results in organopolysiloxane fluids which are partially or totally chain-stopped with silanol groups. In those cases where the reaction mixture contains a diorganosiloxane within the scope of Formula 6 and a low molecular weight organopolysiloxane within the scope of Formula 7 as well as minor amounts of water, e.g., 30 to 1000 parts per million of water, the resulting product will contain chains which are chain-stopped with both triorganosilyl groups and silanol groups.

In addition to being applicable to the organopolysiloxanes previously disclosed, the stabilization method of the present invention is particularly applicable to those highly viscous masses or gummy elastic solids, depending on the state of condensation, which have been prepared by the alkali-metal compound polymerization of low molecular weight materials and which are convertible, e.g., by means of heat, catalysts, or heat and catalysts to the cured, solid, elastic state. These materials will be referred to sometimes hereinafter as "convertible organopolysiloxanes." Although convertible organopolysiloxanes with which the present invention are concerned are well known, for purposes of showing persons skilled in the art the various convertible organopolysiloxanes which can be employed in the practice of the present invention, attention is directed towards the convertible organopolysiloxanes disclosed and claimed in Agnes Patent 2,448,756, Sprung et al. Patent 2,448,556, Sprung Patent 2,484,595, Krieble et al. Patent 2,457,688, Marsden Patent 2,521,528, Warrick Patent 2,541,137 and Hyde Patent 2,490,357. It should be understood that the process of the present invention is not limited to use with the organopolysiloxanes convertible to the solid, cured, elastic state which are disclosed in the aforementioned patents. In addition to the particular convertible organopolysiloxanes of these patents, it should be understood that other convertible organopolysiloxanes containing the same or different silicon-bonded organic substituents may be employed.

The particular convertible organopolysiloxane may be any of those described and well-known heretofore which are obtained by condensing or polymerizing in the presence of an alkali-metal compound, an organopolysiloxane or mixture of organopolysiloxanes containing an average of from about 1.9 to 2.2 and preferably from about 1.98 to 2.1 organic groups per silicon atom. These convertible orgnaopolysiloxanes generally comprise polymeric diorganopolysiloxanes which may contain, if desired, up to 2 mol percent of copolymerized monoorganosiloxanes, for example, polymerized monomethyl siloxane. Generally, I prefer to use as the starting organopolysiloxane from which the convertible, for example, heat convertible organopolysiloxane is prepared, one within the scope of Formula 5, in which $n$ has a value of from about 1.99 to 2.01 organic groups, e.g., methyl groups per silicon atom, and where more than about 80% of the silicon-bonded atoms of the polysiloxane contain 2 silicon-bonded alkyl groups.

The starting organopolysiloxanes used to make the convertible organopolysiloxanes which ultimately can be converted to the cured, solid, elastic state, preferably comprise diorganosiloxanes within the scope of Formula 6 wherein one or more different types of diorganosiloxanes are copolymerized to form the convertible organopolysiloxane. In particular, the organopolysiloxane units employed in preparing the convertible organopolysiloxane can be dimethylsiloxane units alone or copolymers of dimethylsiloxane and diphenylsiloxane, copolymers of dimethylsiloxane, diphenylsiloxane, and methylphenylsiloxane, or copolymers of dimethylsiloxane, diphenylsiloxane, and methyl-beta-cyanoethylsiloxane.

Previously, it has been mentioned that the R'' radical of Formula 5 could be a cyanoalkyl radical, in which case the organopolysiloxane contains silicon-bonded cyanoalkyl radicals. The preparation of a number of these cyanoalkyl containing organopolysiloxanes is described in the copending application of Maurice Prober and Glen D. Cooper, Serial No. 401,701, filed December 21, 1953, and assigned to the same assignee as the present invention. One method for the preparation of these cyanoalkylpolysiloxanes, e.g., an organopolysiloxane containing a silicon-bonded cyanomethyl radical, comprises the chlorination of octamethylcyclotetrasiloxane by means well known to the art, to form chloromethylheptamethylcyclotetrasiloxane. The Grignard reagent of this latter compound is then prepared in the usual fashion and added to a stirred cyanogen solution in diethyl ether. Rectification of the resulting product yields cyanomethylheptamethylcyclotetrasiloxane. This latter compound can then be polymerized alone, for example, by heating in the presence of an alkali-metal compound, such as potassium hydroxide, to form an organopolysiloxane gum containing both methyl and cyanomethyl radicals attached to silicon. This gum can then be converted by suitable catalysts to the solid, cured, elastic state. In addition to polymerizing cyanomethylheptamethylcyclotetrasiloxane alone, this compound can also be copolymerized with other siloxanes such as octamethylcyclotetrasiloxane or octaphenylcyclotetrasiloxane to form organopolysiloxanes containing any desired organic substituents in addition to the cyanomethyl group. Instead of forming gums from the cyanomethylheptamethylcyclotetrasiloxane, linear chain-stopped fluids may be formed by polymerizing the cyanomethylheptamethylcyclotetrasiloxane in the presence of a chain-stopping compound such as hexamethyldisiloxane.

Organopolysiloxanes within the scope of Formula 5 can also be formed by using as a starting material an organopolysiloxane containing silicon-bonded beta-cyanoalkyl radicals, e.g., beta-cyanoethyl radicals, or higher alkyl radicals containing carbon-bonded nitrile groups. Thus, beta-cyanoethylheptamethylcyclotetrasiloxane can be formed by chlorinating octaethylcyclotetrasiloxane to form beta-chloroethylheptaethylcyclotetrasiloxane, forming the Grignard reagent of this latter compound, and reacting the Grignard reagent with an ether solution of cyanogen. The beta-cyanoethylheptaethylcyclotetrasiloxane is converted to an organopolysiloxane fluid or gum by the methods previously described.

An alternative method of forming organopolysiloxanes containing silicon-bonded cyanoalkyl radicals in which the cyano groups are attached to at least the carbon atom which is second removed from silicon is the method of the copending application of Maurice Prober, Serial No. 401,702, filed December 21, 1953, and assigned to the same assignee as the present invention. By the method of this Prober application, a hydrolyzable silicon hydride, such as methyl dichlorosilane, is added to an olefinically unsaturated nitrile, such as acrylonitrile or allyl cyanide. By this process, the silicon hydride adds across the double bond of the unsaturated nitrile to form a hydrolyzable cyanoalkylsilane. In the two cases specifically mentioned, the product would comprise beta-cyanoethylmethyldichlorosilane and gamma-cyanopropylmethyldichlorosilane. These dichlorosilanes can be hydrolyzed in the usual fashion to form organopolysiloxanes of recurring methyl cyanoalkylsiloxane units. These siloxanes can then be polymerized by alkali-metal compounds, either alone or with other organopolysiloxanes to form fluids and elastomers which are convertible to the solid, cured, elastic state.

Although a number of different types of organopolysiloxanes have been described for use in the present invention, it should be understood that no criticality exists with regard to the type of organopolysiloxane. Thus, any of those organopolysiloxanes specifically described above may be employed or any other type of organopolysiloxane may be employed, so long as the organopolysiloxane has been prepared from a lower molecular weight organopolysiloxane by polymerization in the presence of an alkali-metal compound.

The amount of alkali-metal compound employed in the polymerization is not critical to the process of the present invention. However, the amount of alkali-metal compound generally used in the preparation of high molecular weight organopolysiloxanes from lower molecular weight materials generally ranges in amount from about 0.001 to 1 percent by weight, calculated as the alkali-metal hydroxide, based on the weight of the organopolysiloxane being polymerized. The use of the alkali-metal compound in this range produces satisfactory polymerization and no particular benefit is derived from using less than 0.001 percent, by weight, or more than about one percent by weight of the alkali-metal compound. The particular physical conditions under which the alkali-metal compound polymerization takes place are also not critical, but, the reaction is generally effected at a temperature of from about 80 to 175° C., since satisfactory reaction rates are found in this temperature range. The use of reaction temperatures below about 80° C. offers a disadvantage in that the reaction rate is relatively slow. No particular advantage is observed from carrying out the polymerization at a temperature much above 175° C. Generally, the polymerization reaction is carried out at atmospheric pressure, although the use of subatmospheric or super atmospheric pressure is not precluded.

The alkali-metal compound polymerized organopolysiloxane is stabilized by merely contacting the organopolysiloxane with one of the quaternary compounds within the scope of the present invention by any suitable method. For example, a solid powdered quaternary compound, for example, tetrabutyl ammonium iodide or tetraethyl phosphonium chloride, can be added to the polymerized organopolysiloxane and the mixture stirred so as to assure complete dispersion of the quaternary compound in the organopolysiloxane. This dispersion can be accomplished in the case of organopolysiloxane fluids by merely stirring a mixture of the powdered quaternary compound in the fluid for a sufficient time to assure that stabilization of the fluid has been effected. The time required for effecting this stabilizing is relatively short, varying from a few minutes up to an hour or more, depending on the viscosity of the fluid. Since the quaternary compounds have only a limited solubility in organosilicon materials, it will be found that a suspension of the quaternary compound sometimes exists in the fluid after stabilization. This suspension may be easily removed by filtration if clarity of the polymerized fluid is an important factor. Where clarity is not an important factor, the quaternary compound can be left in the fluid, since the presence of the quaternary compound has no adverse effect on the moisture resistance or thermal stability of the fluid.

In addition to stabilizing the alkali-metal compound polymerized organopolysiloxane fluids with solid quaternary compounds within the scope of the present invention, it is also possible to employ solutions of the quaternary compound, such as aqueous solutions, alcoholic solutions, or solutions or suspensions of the quaternary compound in organic solvents, such as hydrocarbon solvents, including benzene, toluene, xylene, or in other organic solvents such as carbon disulfide or carbon tetrachloride. When employing solutions or suspensions of the quaternary compound for stabilization, the solution or suspension is merely added to the organopolysiloxane fluid and the resulting mixture is stirred for a sufficient time to effect stabilization. Again, the time can vary from a few minutes up to several hours, depending on the viscosity of the fluid and the particular solution or suspension of the quaternary compound employed. At the end of this time, the solvent for the quaternary compound can be separated from the organopolysiloxane by decantation if the solvent is insoluble in the organopolysiloxane as in the case of water or by distillation in the case of a number of the organic solvents.

In treating solid alkali-metal compound polymerized organopolysiloxane gums by the method of the present invention, the same general techniques can be employed as in the case with fluids. Thus, the powdered quaternary compound can be dispersed in the gum or a solution of the quaternary compound in water or one of the aforementioned organic solvents may be dispersed in the gum. Satisfactory mixing of the quaternary compound with the gum is accomplished by the use of differential rubber milling rolls or a Banbury type mixer, to insure uniform dispersion of the quaternary compound so as to obtain complete stabilization of the organopolysiloxane. Again, the time of contact of quaternary compound with the organopolysiloxane gum is not critical, satisfactory stabilization having been obtained with times as low as several minutes to times up to several hours. In the case of organopolysiloxane gums, there is no necessity for removing any excess of quaternary compound from the gum.

The amount of quaternary ammonium halide or quaternary phosphonium halide employed in the stabilization of alkali-metal compound polymerized organopolysiloxanes is not critical. Although the exact mechanism of the reaction involving the quaternary compound is not known with certainty, it has been found that the quaternary compound and the alkali-metal compound react on a mole for mole basis so that one mole of the quaternary halide is required for each mole of alkali-metal in the polymerized organopolysiloxanes. The use of molar excesses of the quaternary ammonium or phosphonium halide offers an advantage in that a shorter time is required to effect complete stabilization of the alkali-metal compound. Thus, in the preferred embodiment of our invention we employ from about 1.5 to 10 moles of the quaternary compound per mole of alkali-metal compound in the organopolysiloxane. The temperature at which the stabilization is effected is not critical, satisfactory stabilization being obtained at room temperature, for example, a temperature of around 20° C. However, to insure satisfactory rates of stabilization temperatures of the order of 80 to 150° C. are preferred.

In order that those skilled in the art may better understand how the present invention may be practiced, the following examples are given by way of illustration and not by way of limitation.

*Example 1*

A polydimethylsiloxane gum was prepared by heating a mixture of octamethylcyclotetrasiloxane and 0.001 percent, by weight, based on the weight of the siloxane, of solid potassium hydroxide, at a temperature of about 160° C. for four hours, during which time the consistency of the mixture changed from that of a low molecular weight fluid to a high molecular weight solid gum, having a viscosity in excess of about 10 million centipoises. A first portion of this gum was kept as a control and a second portion was neutralized by adding thereto sufficient of 1 percent aqueous tetrabutyl ammonium iodide to provide about 2 moles of tetrabutyl ammonium iodide per mole of potassium hydroxide originally employed. The mixture of gum and tetrabutyl ammonium iodide was mixed for four hours at room temperature in a laboratory dough mixer. Both the control and the gum containing the tetrabutyl ammonium iodide were then placed on a surface heated to a temperature of 400° C. and left on the surface for 15 minutes while a slowly moving stream of moist nitrogen was passed over the materials to provide moisture and to sweep away volatile materials. At the end of this time, the weight loss of the control and the material containing the tetrabutyl ammonium iodide was measured. The control had a weight loss of 58.7% while the tetrabutyl ammonium iodide treated gum exhibited a weight loss of 14.4%. This 14.4% represented removal of unreacted low molecular weight siloxanes in the gum, rather than any deficiency in the thermal stability or moisture stability of the gum.

*Example 2*

This example illustrates the stabilization of a silicone gum containing both methyl and gamma-cyanopropyl groups by the method of the present invention. Gamma-cyanopropylmethyldichlorosilane was prepared by heating equal molar amounts of methyldichlorosilane and allyl cyanide at a temperature of about 110° C. for eight hours in the presence of 10 percent, by weight, of a platinum charcoal catalyst. Rectification of the reaction mixture yielded gamma-cyanopropylmethyldichlorosilane which was hydrolyzed by the slow addition of 1 part of the silane to 4 parts of water. The resulting oil layer was then separated and rectified to give a clear oil consisting essentially of recurring gamma-cyanopropylmethylsiloxane units. The oil had a viscosity of about 500 centipoises at 25° C. This oil was mixed with 100 parts per million of potassium hydroxide and heated for 3 hours at 140° C. to produce a soft gum. Forty mole percent of this soft gum was mixed in a doughmixer with 60 mole percent of the polydimethylsiloxane gum described in Example 1. The mixture in the doughmixer contained sufficient potassium hydroxide to provide about 100 parts per million of potassium hydroxide in the final gum, which was prepared by doughmixing the ingredients for 16 hours at 140° C., yielding a gum having a viscosity of approximately 8 million centipoises. A second copolymer of the gamma-cyanopropylmethylsiloxane gum and the polydimethylsiloxane gum was prepared in the same manner except that the proportions of ingredients were such that 70 mole percent of the gamma-cyanopropylmethylsiloxane gum used and 30 mole percent of the polydimethylsiloxane gum was used. A sufficient amount of tetrabutyl ammonium iodide was added to each of these copolymers as the 15 percent solution of the ammonium compound in acetonitrile to provide three moles of tetrabutyl ammonium iodide per mole of potassium hydroxide. The tetrabutyl ammonium iodide was milled into the copolymers for two hours at 150° C. At the end of this time both of the copolymers were subjected to the thermal stability and moisture stability test of Example 1 (surface heated to 400° C. for 15 minutes in a stream of moist nitrogen). At the end of this time the 40 mole percent copolymer exhibited a weight loss of 16 percent and the 70 percent copolymer exhibited a weight loss of 11 percent, indicating that the quaternary ammonium iodide was satisfactory as a stabilizing agent for this gum. When the same stability test was run on these two copolymers but with the omission of the quaternary ammonium iodide, a weight loss in excess of 95 percent was observed.

The two quaternary ammonium iodide stabilized copolymers were converted to silicone rubber by compounding 100 parts of each copolymer with 40 parts of finely divided fume silica and one part of benzoyl peroxide. The compounded material was then cured for 16 hours at 300° F. to produce silicone rubber. The 40 percent copolymer had a Shore A hardness of 74, a tensile strength of 450 pounds per square inch and 100 percent elongation. The 70 percent copolymer had a Shore A hardness of 68, a tensile strength of 420 pounds per square inch and 140 percent elongation.

*Example 3*

Following the procedure of Example 1, a polydimethylsiloxane gum was prepared employing about 12 parts per million of potassium hydroxide as a polymerization catalyst. This gum had a viscosity of 15 million centipoises. One portion of this gum was kept as a control and the remainder was mixed in a doughmixer at 150° C. for one hour with sufficient 4.4 percent aqueous solution of tetraethyl phosphonium iodide to provide about 3.3 moles of the iodide per mole of potassium hydroxide initially employed. At the end of this time the thermal stability and moisture stability of both the control and the stabilized material were examined by the test of Example 1 (surface heated to 400° C. for 15 minutes in a stream of moist nitrogen). At the end of this time the control exhibited a weight loss of 94 percent while the tetraethyl phosphonium iodide stabilized gum exhibited a weight loss of only 13.6 percent.

Although the foregoing examples have of necessity been limited to only a few of the many possible types of alkali-metal compound polymerized organopolysiloxanes, it is again emphasized that the quaternary ammonium halide and quaternary phosphonium halide stabilization of the present invention is applicable to any type of organopolysiloxane which has been prepared by polymerization of a low molecular weight organopolysiloxane to a higher molecular weight organopolysiloxane employing an alkali-metal compound polymerization catalyst. In particular, the present invention is applicable to those organopolysiloxanes having viscosities of from about 1,000 centipoises to over 30,000,000 centipoises. However, it should also be understood that our process is applicable to alkali-metal compound polymerized organopolysiloxanes having molecular weight below 1,000 centipoises, as well as to alkali-metal catalyzed organopolysiloxane resins, e.g., those resins in which the ratio of organo groups to silicon atoms is below about 1.9, e.g., from about 1.1 to 1.7.

The organopolysiloxanes prepared by the method of the present invention have the same utility as higher materials. Thus, the organopolysiloxane resins may be employed as molding compounds, for example, in the encapsulation of electrical equipment. The fluid organopolysiloxanes are useful as substitutes for hydraulic fluids, as lubricants, as heat transfer fluids, etc. The organopolysiloxane gums, which can be converted to silicone rubber by methods well known in the art are useful as prior art silicone rubbers, i.e., as coatings for wires, as gasket materials, for the encapsulation of electrical apparatus, for shock absorbers, etc.

What I claim as new and desire to secure by Letters Patent of the United States is:

1. A composition of matter of improved thermal stability and moisture stability which comprises (1) an organopolysiloxane which has been polymerized from a lower molecular weight organopolysiloxane state to a higher molecular weight organopolysiloxane state with from about 0.001 to 1 percent by weight, based on the weight of said organopolysiloxane, of an alkali-metal compound which is a basic siloxane rearranging and polymerizing agent and which alkali-metal compound contains an alkali-metal ion used in the preparation of higher molecular weight organopolysiloxanes from lower molecular weight organopolysiloxanes and which alkali-metal ion is present in said organopolysiloxane, the organic groups of said organopolysiloxane being selected from the class consisting of monovalent hydrocarbon radicals, halogenated monovalent hydrocarbon radicals and cyanoalkyl radicals, there being present from 1.9 to 2.5 organic groups per silicon atom in said organopolysiloxane and (2) a quaternary compound selected from the class consisting of quaternary ammonium halides having the formula $(Y)_4NX$ and quaternary phosphonium halides having the formula $(Y)_4PX$, where Y represents a monovalent hydrocarbon radical free of olefinic unsaturation and X is halogen, said quarternary compound being present in an amount sufficient to provide from about 1.5 to 10 moles of said quaternary compound per mole of said alkali-metal compound.

2. A composition of matter of claim 1 in which the alkali-metal compound is an alkali-metal hydroxide.

3. A composition of matter of claim 1 in which the alkali-metal compound is an alkali-metal hydroxide and in which the quaternary compound is a quaternary ammonium halide having the formula $(Y)_4NX$, where Y represents a monovalent hydrocarbon radical free of olefinic unsaturation and X is halogen.

4. A composition of matter of claim 1 in which the alkali-metal compound is an alkali-metal hydroxide and in which the quaternary compound is a quaternary phosphonium halide having the formula $(Y)_4PX$, where Y represents a monovalent hydrocarbon radical free of olefinic unsaturation and X is halogen.

5. The process for improving the thermal stability and moisture stability of an organopolysiloxane which has been polymerized from a lower molecular weight organopolysiloxane state to a higher molecular weight organopolysiloxane state with from about 0.001 to 1 percent by weight, based on the weight of the said organopolysiloxane, of an alkali-metal compound which is a basic siloxane rearranging and polymerizing agent and which alakli-metal compound contains an alkali-metal ion used in the preparation of higher molecular weight organopolysiloxanes from lower molecular weight organopolysiloxanes and which alkali-metal ion is present in said organopolysiloxane, the organic groups of said organopolysiloxane being selected from the class consisting of monovalent hydrocarbon radicals, halogenated monovalent hydrocarbon radicals and cyanoalkyl radicals, there being present from 1.9 to 2.5 organic groups per silicon atom in said organopolysiloxane, which process comprises mixing said organopolysiloxane with a quaternary compound selected from the class consisting of quaternary ammonium halides having the formula $(Y)_4NX$ and quaternary phosphonium halides having the formula $(Y)_4PX$, where Y is a monovalent hydrocarbon radical free of olefinic unsaturation and X is halogen, said quaternary compound being employed in an amount equal to from about 1.5 to 10 moles per mole of said alkali-metal compound.

6. The process of claim 5 in which the alkali-metal compound is an alkali-metal hydroxide.

7. The process of claim 5 in which the alkali-metal compound is an alkali-metal hydroxide and in which the quaternary compound is a quaternary ammonium halide having the formula $(Y)_4NX$, where Y is a monovalent hydrocarbon radical free of olefinic unsaturation and X is halogen.

8. The process of claim 5 in which the alkali-metal compound is an alkali-metal hydroxide and in which the quaternary compound is a quaternary phosphonium halide having the formula $(Y)_4PX$, where Y is a monovalent hydrocarbon radical free of olefinic unsaturation and X is halogen.

References Cited in the file of this patent

UNITED STATES PATENTS

| | | |
|---|---|---|
| 2,489,138 | Hyde et al. | Nov. 22, 1949 |
| 2,521,674 | Britton et al. | Sept. 12, 1950 |
| 2,521,678 | White et al. | Sept. 12, 1950 |
| 2,721,812 | Iler | Oct. 25, 1955 |
| 2,883,366 | Kantor et al. | Apr. 21, 1959 |